US010956780B2

(12) United States Patent
She et al.

(10) Patent No.: US 10,956,780 B2
(45) Date of Patent: Mar. 23, 2021

(54) DETECTING INFECTION OF PLANT DISEASES WITH IMPROVED MACHINE LEARNING

(71) Applicant: The Climate Corporation, San Francisco, CA (US)

(72) Inventors: Ying She, Union City, CA (US); Wei Guan, Pleasanton, CA (US)

(73) Assignee: THE CLIMATE CORPORATION, San Francisco, CA (US)

( * ) Notice: Subject to any disclaimer, the term of this patent is extended or adjusted under 35 U.S.C. 154(b) by 0 days.

(21) Appl. No.: 16/662,023

(22) Filed: Oct. 24, 2019

(65) Prior Publication Data

US 2020/0134358 A1 Apr. 30, 2020

Related U.S. Application Data

(60) Provisional application No. 62/750,118, filed on Oct. 24, 2018.

(51) Int. Cl.
*G06K 9/62* (2006.01)
*G06N 3/04* (2006.01)
*G06N 3/08* (2006.01)
*G06N 5/00* (2006.01)

(52) U.S. Cl.
CPC ............ *G06K 9/623* (2013.01); *G06K 9/628* (2013.01); *G06K 9/6262* (2013.01); *G06N 3/04* (2013.01); *G06N 3/08* (2013.01); *G06N 5/003* (2013.01); *G06K 2209/17* (2013.01)

(58) Field of Classification Search
None
See application file for complete search history.

(56) References Cited

U.S. PATENT DOCUMENTS

| 2015/0278642 | A1* | 10/2015 | Chertok | G06K 7/1482 382/156 |
| 2016/0162782 | A1* | 6/2016 | Park | G06N 3/082 706/17 |
| 2016/0174902 | A1* | 6/2016 | Georgescu | G06T 7/0012 600/408 |

(Continued)

FOREIGN PATENT DOCUMENTS

WO  WO 2017/194276 A1  11/2017

OTHER PUBLICATIONS

The International Searching Authority, "Search Report" in application No. PCT/US2019/057739, dated Jan. 13, 2020, 11 pages.

(Continued)

*Primary Examiner* — Jiangeng Sun
(74) *Attorney, Agent, or Firm* — Hickman Becker Bingham Ledesma LLP

(57) ABSTRACT

A system and processing methods for refining a convolutional neural network (CNN) to capture characterizing features of different classes are disclosed. In some embodiments, the system is programmed to start with the filters in one of the last few convolutional layers of the initial CNN, which often correspond to more class-specific features, rank them to hone in on more relevant filters, and update the initial CNN by turning off the less relevant filters in that one convolutional layer. The result is often a more generalized CNN that is rid of certain filters that do not help characterize the classes.

20 Claims, 11 Drawing Sheets

(56) References Cited

U.S. PATENT DOCUMENTS

| | | |
|---|---|---|
| 2017/0032222 A1 | 2/2017 | Sharma et al. |
| 2017/0103258 A1* | 4/2017 | Yu .............................. G06T 7/11 |
| 2017/0300811 A1* | 10/2017 | Merhav .................. G06N 3/084 |
| 2017/0372174 A1 | 12/2017 | Wshah et al. |
| 2018/0336468 A1* | 11/2018 | Kadav .................. G06K 9/6217 |
| 2019/0066234 A1 | 2/2019 | Bedoya et al. |
| 2019/0303720 A1* | 10/2019 | Karam ................... G06K 9/624 |
| 2020/0082206 A1* | 3/2020 | Jin .......................... G06K 9/627 |

OTHER PUBLICATIONS

Mohanty et al., "Using Deep Learning for Image-Based Plant Disease Derection", Front. Plant Sci., dated Sep. 22, 2016, 10 pages.

Current Claims in application No. PCT/US2019/057739, dated Jan. 2020, 4 pages.

* cited by examiner

Fig. 2
(a)
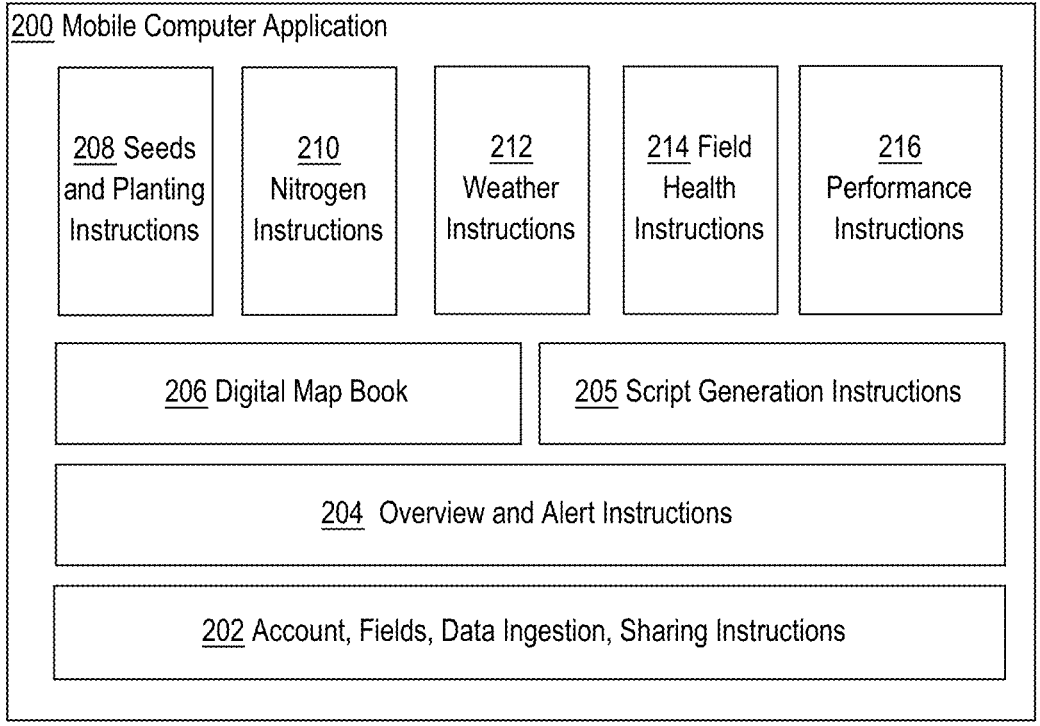
(b)
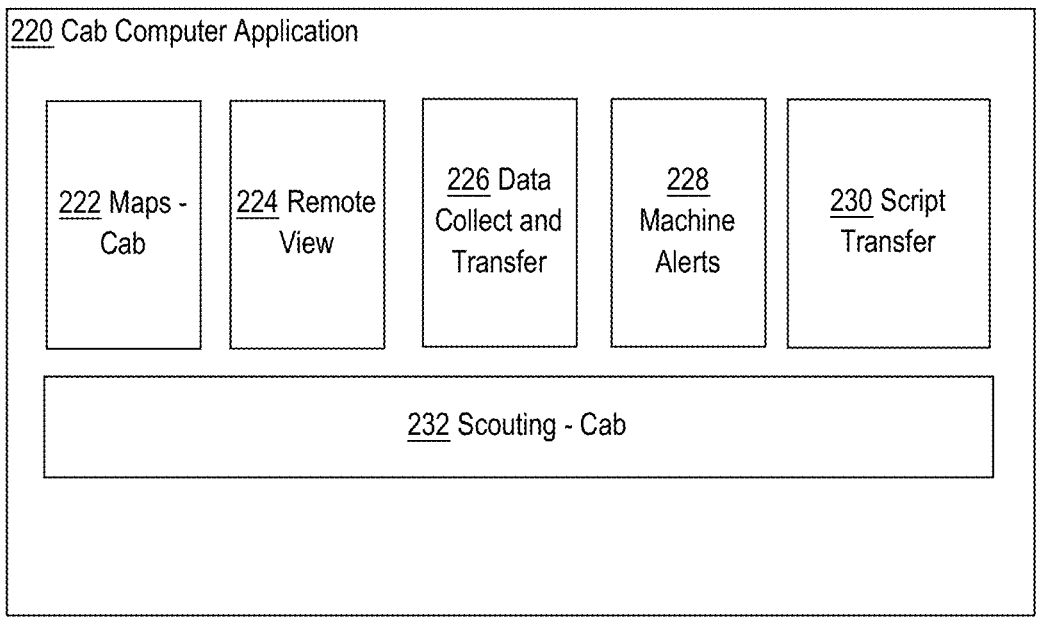

Data Manager

[ Nitrogen | Planting | Practices | Soil ]

Planting 1(4 Fields)
Crop Corn Product
Plant Date: 2016-04-12
ILU 112 | Pop: 34000
[ Edit ] [ Apply ]

Planting 2(0 Fields)
Crop Corn Product
Plant Date: 2016-04-15
ILU 83 | Pop: 34000
[ Edit ] [ Apply ]

Planting 3(0 Fields)
Crop Corn Product
Plant Date: 2016-04-13
ILU 83 | Pop: 34000
[ Edit ] [ Apply ]

Planting 4(1 Fields)
Crop Corn Product
Plant Date: 2016-04-13
ILU 112 | Pop: 34000
[ Edit ] [ Apply ]

+ Add New Planting Plan

| | CROP | PLANTED ACRES | PRODUCT | RELATIVE MATURITY | TARGET YIELD | POPULATION(AVG) | PLA |
|---|---|---|---|---|---|---|---|
| ☐ Select All | | | | | | | |
| ☐ Ames, IA 1<br>Corn \| 100 \| Boone, IA | Corn | — | DMC82-M | 112 | 160 | 34000 | Apr |
| ☐ Austin, MN 1<br>Corn \| 100 \| Fredricks, MN | Corn | — | DMC82-M | 114 | | 36000 | Apr |
| ☐ Boone, IN 1<br>Corn \| 100 \| Boone, IA | Corn | — | DMC82-M | 112 | 150 | 34000 | Apr |
| ☐ Champaign 1<br>Corn \| 100 \| Champaign, IL | Corn | — | — | 112 | 200 | 34000 | Apr |
| ☐ E Nebraska 1<br>Corn \| 100 \| Burt, NE | Corn | — | — | 112 | 160 | 34000 | Apr |

FIG. 6

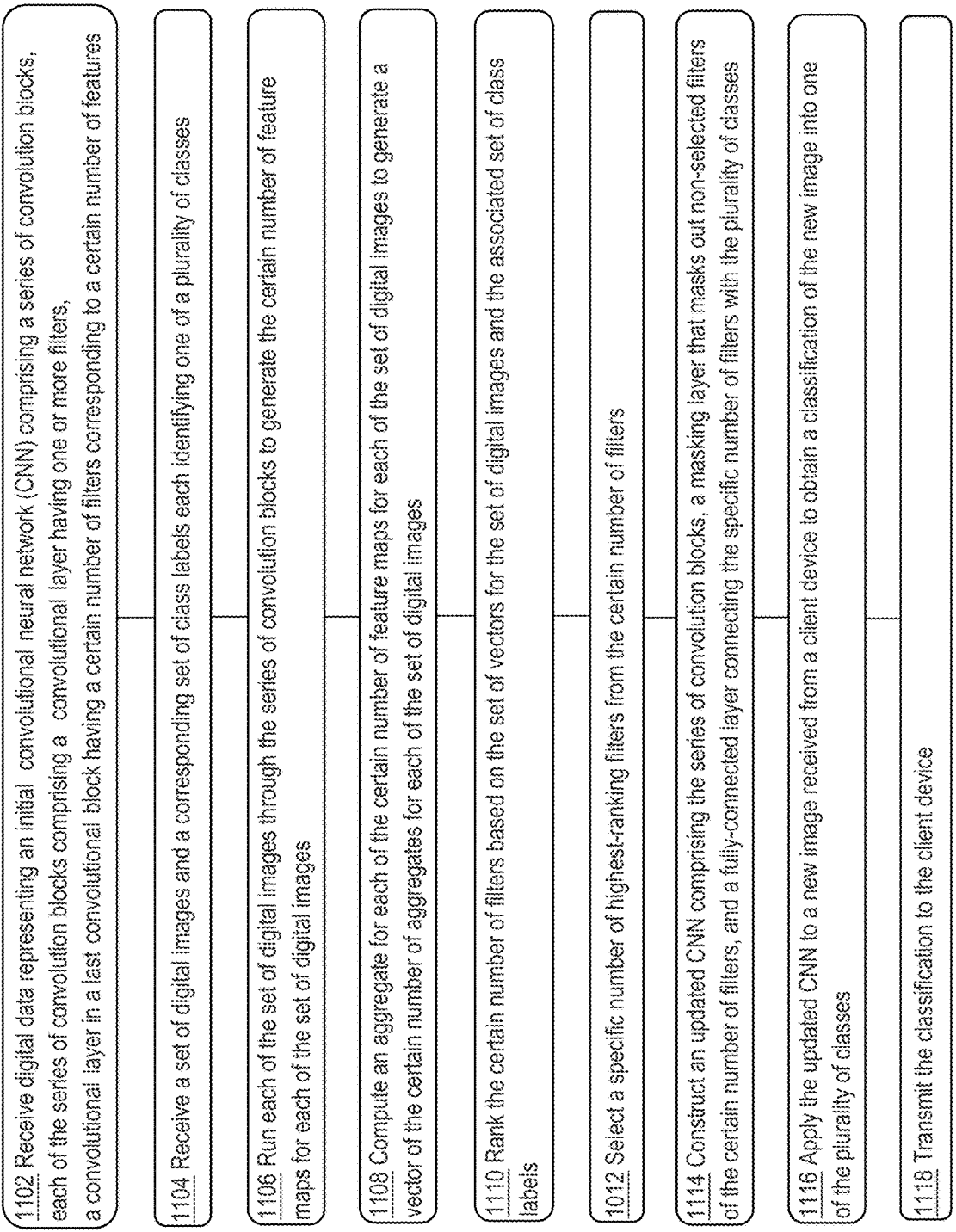

DETECTING INFECTION OF PLANT DISEASES WITH IMPROVED MACHINE LEARNING

BENEFIT CLAIM

This application claims the benefit under 35 U.S.C. § 119(e) of provisional application 62/750,118, filed Oct. 24, 2018, the entire contents of which are hereby incorporated by reference for all purposes as if fully set forth herein. Applicant hereby rescinds any disclaimer of claim scope in the parent applications or the prosecution history thereof and advises the USPTO that the claims in this application may be broader than any claim in the parent applications.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. ©2015-2019 The Climate Corporation.

FIELD OF THE DISCLOSURE

The present disclosure relates to the technical fields of plant disease recognition and machine learning. The present disclosure also relates to the technical field of analyzing plant photos with improved machine learning models for disease detection.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Plant disease detection is important in agriculture. Today, an automated approach often involves classifying plant photos, which can be implemented by applying a convolutional neural network (CNN). A CNN has a relatively complex structure. A typical CNN can include a series of convolution blocks, each comprising a convolutional layer, a pooling layer, and a rectified linear unit (RELU) layer. Each convolutional layer then includes multiple filters respectively corresponding to features of an image. The complex structure may provide specificity to the classification and increase accuracy of the classification result.

However, symptoms of a plant disease can appear in various forms. To detect a plant disease, sometimes a single CNN built from a relatively small training set does not suffice. FIG. 7 illustrates sample photos of two plants grown under different conditions but infected by a common plant disease. The photos show corn leaves, and the common plant disease is grey leaf spot (GLS). The image 702 shows a leaf that was inoculated (disease inoculated on purpose), while the image 704 shows a leaf that was not inoculated. The two photos show similar lesions overall, but the lesions in the image 702, such as the lesion 706, have smoother shapes on a cleaner background, while the lesions in the image 704, such as the lesion 708, have more jagged shapes on a busier background, which might include not only a leaf but the soil, for example. Therefore, one CNN that is designed to recognize GLS from photos of inoculated leaves may not recognize GLS from photos of non-inoculated leaves, and vice versa.

Given the large number of plant diseases and environmental factors and the frequent challenge to obtain enough samples for training digital models to detect plant diseases, it would be helpful to have an approach that can recognize multiple diseases across various environmental factors with satisfactory efficiency and accuracy without requiring a specific volume of training data.

SUMMARY

The appended claims may serve as a summary of the disclosure.

BRIEF DESCRIPTION OF THE DRAWINGS

In the drawings:

FIG. 2 illustrates two views of an example logical organization of sets of instructions in main memory when an example mobile application is loaded for execution.

FIG. 6 depicts an example embodiment of a spreadsheet view for data entry.

FIG. 11 illustrates an example method performed by a server computer that is programmed for refining a CNN to focus on class-specific features.

DETAILED DESCRIPTION

Figure 1:
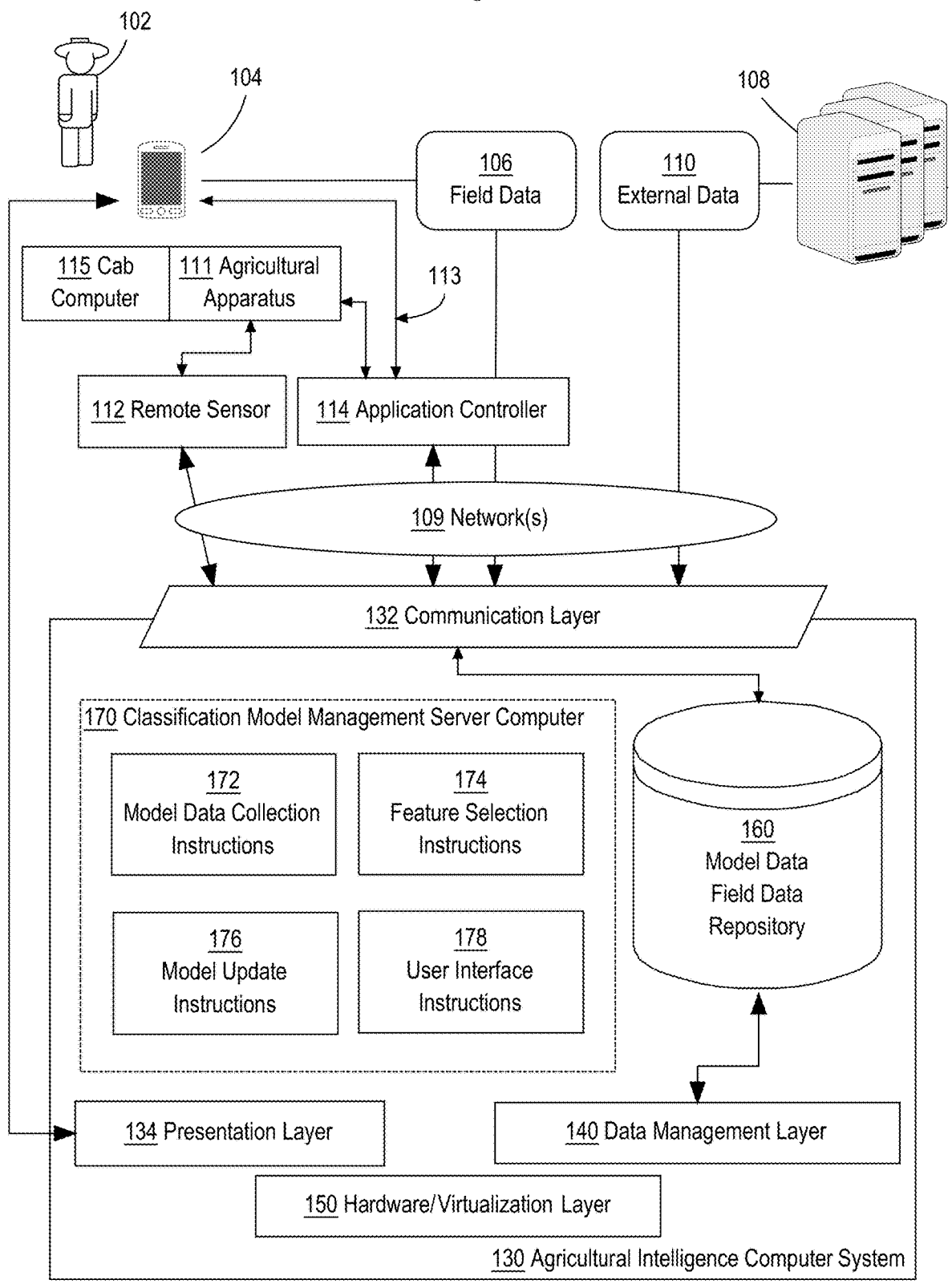
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM 2.4. PROCESS OVERVIEW—AGRONOMIC MODEL TRAINING
2.5. IMPLEMENTATION EXAMPLE—HARDWARE OVERVIEW
3. FUNCTIONAL DESCRIPTIONS
3.1 FEATURE MAP COLLECTION
3.2 FEATURE SELECTION
3.3 CLASSIFICATION MODEL MODIFICATION
3.4 ALTERNATIVE EMBODIMENTS
3.5 EXAMPLE PROCESSES
4. EXTENSIONS AND ALTERNATIVES

1. General Overview

A system and processing methods for refining a convolutional neural network (CNN) to capture characterizing features of different classes are disclosed. In some embodiments, the system is programmed to start with the filters in one of the last few convolutional layers of the initial CNN, which often correspond to more class-specific features, rank them to hone in on more relevant filters, and update the initial CNN by turning off the less relevant filters in that one convolutional layer. The result is often a more generalized CNN that is rid of certain filters that do not help characterize the classes.

In some embodiments, the system is programmed to receive an initial CNN that classifies items into multiple classes, the training set of items for the initial CNN, and optionally an additional set of items that also belong to the multiple classes but might reflect different environmental factors. For example, the items can be photos of the corn plants, the initial CNN could be designed to classify the photos and the corresponding corn plants into a healthy class or several disease classes. The training set might correspond to inoculated corn plants, while the additional set might correspond to regular, non-inoculated corn plants. The initial CNN typically includes a series of convolution blocks, each including a convolutional layer.

In some embodiments, the system is programmed to use the training set and optionally the additional set of items to select certain filters from the filters in the last convolutional layer or another specific layer of the initial CNN. For each of the training set of items and the additional set of items, a vector can be constructed, with one dimension for each of the filters. For example, when the last convolutional layer has 512 filters, the vector for an input image would contain 512 values, each being an aggregate of the values in the feature map produced by the filter from the input image. The system is programmed to then rank the filters based on the vectors obtained from the items, such as by constructing a random forest to obtain importance indicators of the filters. The system is programmed to further select a certain number of the highest-ranking filters out of all the filters in the last convolutional layer.

In some embodiments, the system is programmed to build an updated CNN by appending to the series of convolution blocks in the initial CNN a masking layer to turn off non-selected filters. The masking layer can be followed by a fully connected layer that connects the selected filters to the multiple classes. When the initial CNN includes such a fully-connected layer that connects all the filters in the last convolutional layer to the multiple classes, the weights in the fully-connected layer for the selected filters can be reused in the updated CNN; otherwise, these weights can be trained. The updated CNN is then expected to perform well for the addition set of items or other items that belong to the multiple classes, even when neither the training or the update of the initial CNN substantially relies on such additional items that reflect environmental or other extraneous factors.

The system produces various technical benefits. The system provides a leaner digital model that is focused on the features specifically characterizing each class. The focus leads to the ability to get pass environmental or other extraneous factors and recognize more class members, thus increasing the overall classification accuracy. In the case of plant disease recognition, the system enables more effective detection and remedying of plant diseases and promotes the health and growth of crops. The leanness leads to a reduced utilization of computational resources, requiring less memory for storing the digital model and less CPU/GPU time for executing the digital model. In addition, by refining the digital model based on available data, the system eliminates a requirement for more training data to build a complex model that might not achieve significantly higher classification accuracy while capturing various nuanced, non-representative aspects of the classes.

Other aspects and features of embodiments will become apparent from other sections of the disclosure.

2. Example Agricultural Intelligence Computer System 2.1 Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorous, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, and model and field data repository 160. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
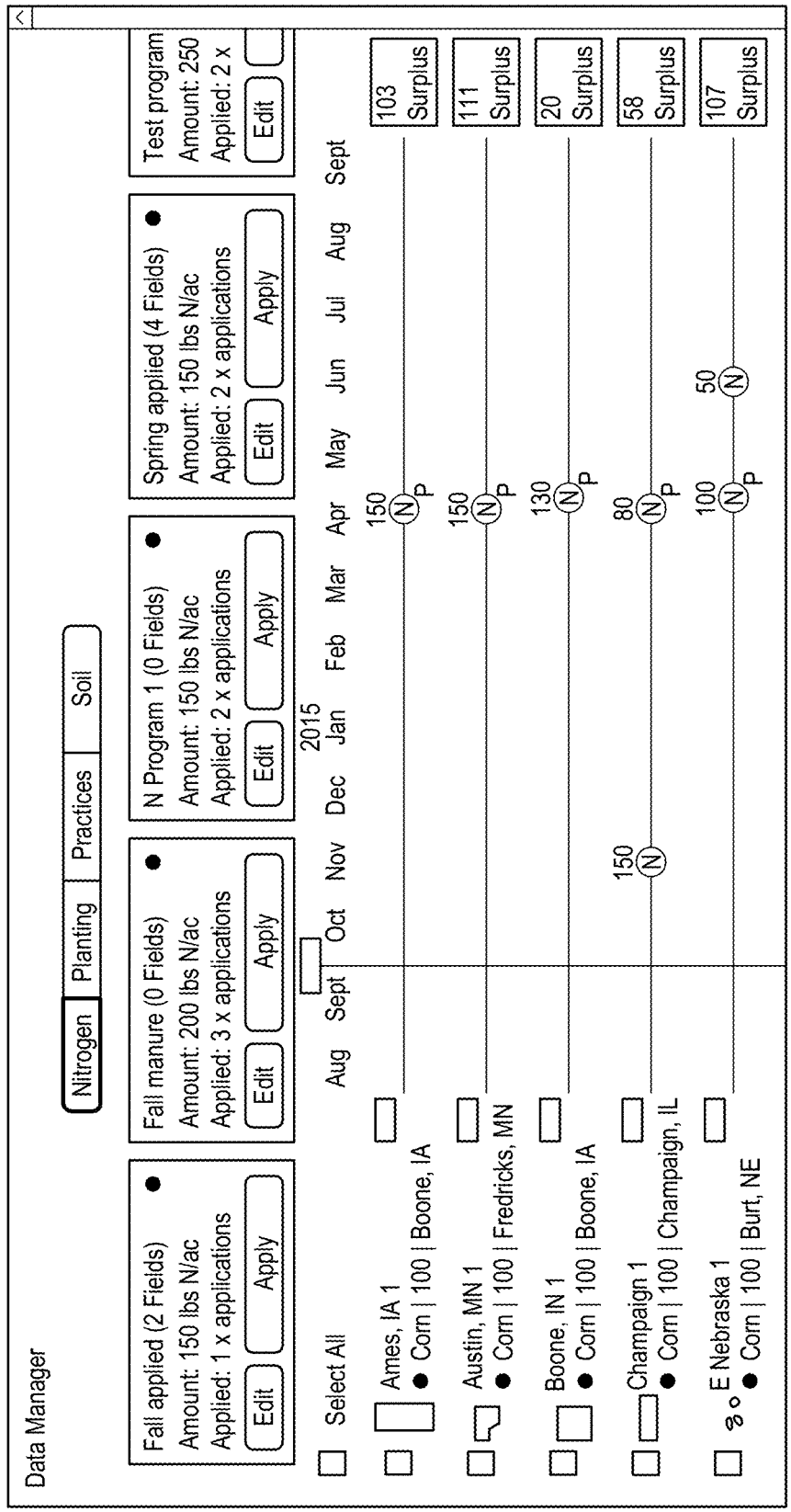
FIG. 5 depicts an example embodiment of a timeline view for data entry.
Figure 7:
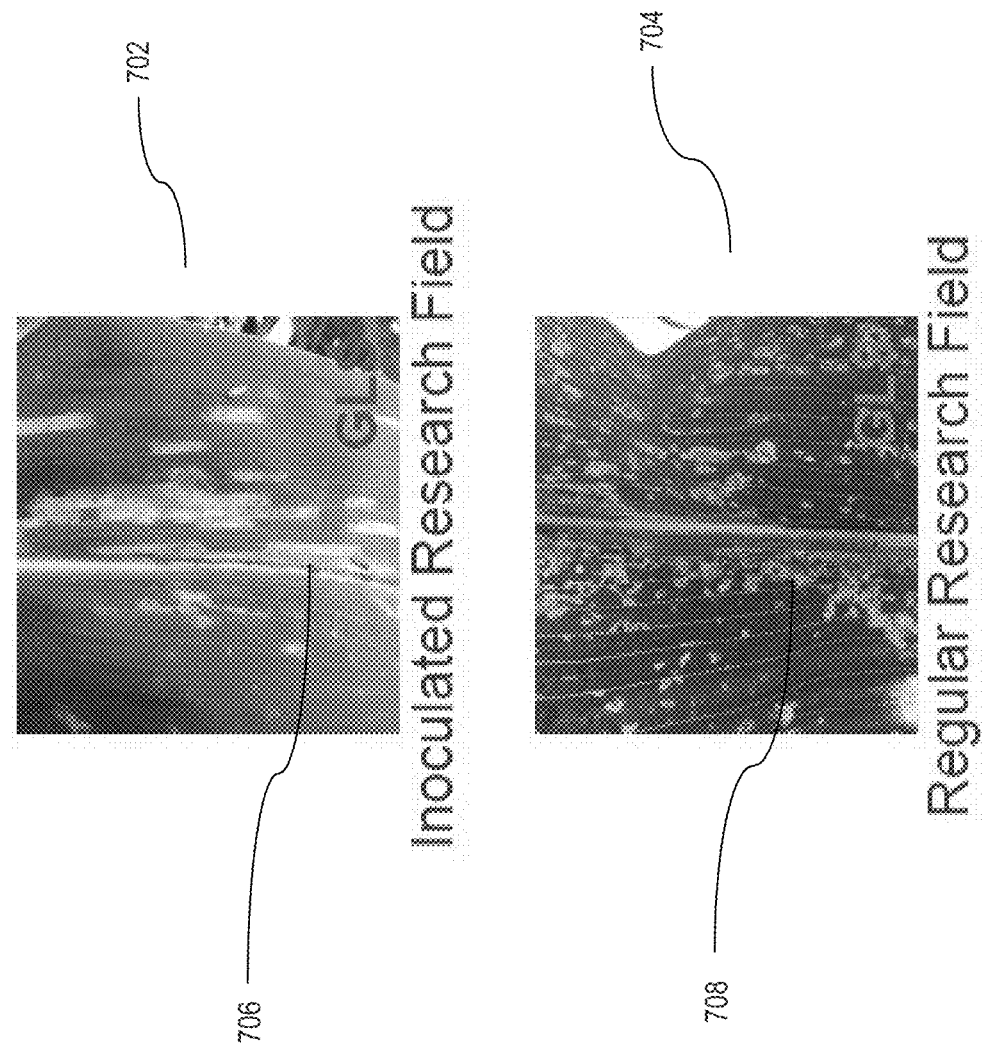
FIG. 7 illustrates sample photos of two plants grown under different conditions but infected by a common plant disease.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil application, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things.

Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

In an embodiment, agricultural intelligence computer system 130 is programmed to comprise a classification model management server computer (server) 170. The server 170 170 is further configured to comprise model data collection instructions 172, feature selection instructions 174, model update instructions 176, and user interface instructions 178.

In some embodiments, the model data collection instructions 172 offer computer-executable instructions to receive an initial convolutional neural network (CNN) that classifies items into multiple classes and a set of items that fall into the multiple classes for updating the initial CNN. The model data collection instructions 172 offer further computer-executable instructions to generate a set of vectors for the set of items, each vector having a certain number of values that correspond to a certain number of features captured by a specific convolutional layer of the initial CNN.

In some embodiments, the feature selection instructions 174 offer computer-executable instructions to rank the certain number of features using the set of vectors and select a specific number of highest-ranking features. The ranking can be performed using random forests, principal component analysis, or other techniques for ordering specific attributes.

In some embodiments, the model update instructions 176 offer computer-executable instructions to update the initial CNN by utilizing only the filters corresponding to the selected features in the specific convolutional layer to recognize only the selected features. The update includes adding a masking layer that masks off non-selected filters, effectively limiting the classification of an item based on only the selected features. In addition, the update can include further masking out some of the selected features based on expert input. The update can further include determining weights for a final fully-connected layer that connects the selected filters with the multiple classes.

In some embodiments, the user interface instructions 178 offer computer-executable instructions to manage communications with user devices. The management may include receiving from a user device a new item that needs to be classified, applying the updated CNN to the new item, and transmitting classification outcomes to the user device. The management may further include preparing class activation or feature projection data for specific features captured by the initial CNN, including the selected features, transmitting such data to a user device for visualization of the specific features, and receiving a further selection from the specific features.

Each component of the server 170 comprises a set of one or more pages of main memory, such as RAM, in the agricultural intelligence computer system 130 into which executable instructions have been loaded and which when executed cause the agricultural intelligence computing system to perform the functions or operations that are described herein with reference to those modules. For example, the model data collection module 172 may comprise a set of pages in RAM that contain instructions which when executed cause performing the location selection functions that are described herein. The instructions may be in machine executable code in the instruction set of a CPU and may have been compiled based upon source code written in JAVA, C, C++, OBJECTIVE-C, or any other human-readable programming language or environment, alone or in combination with scripts in JAVASCRIPT, other scripting languages and other programming source text. The term "pages" is intended to refer broadly to any region within main memory and the specific terminology used in a system may vary depending on the memory architecture or processor architecture. In another embodiment, each component of the server 170 also may represent one or more files or projects of source code that are digitally stored in a mass storage device such as non-volatile RAM or disk storage, in the agricultural intelligence computer system 130 or a separate repository system, which when compiled or interpreted cause generating executable instructions which when executed cause the agricultural intelligence computing system to perform the functions or operations that are described herein with reference to those modules. In other words, the drawing figure may represent the manner in which programmers or software developers organize and arrange source code for later compilation into an executable, or interpretation into bytecode or the equivalent, for execution by the agricultural intelligence computer system 130.

Figure 4:
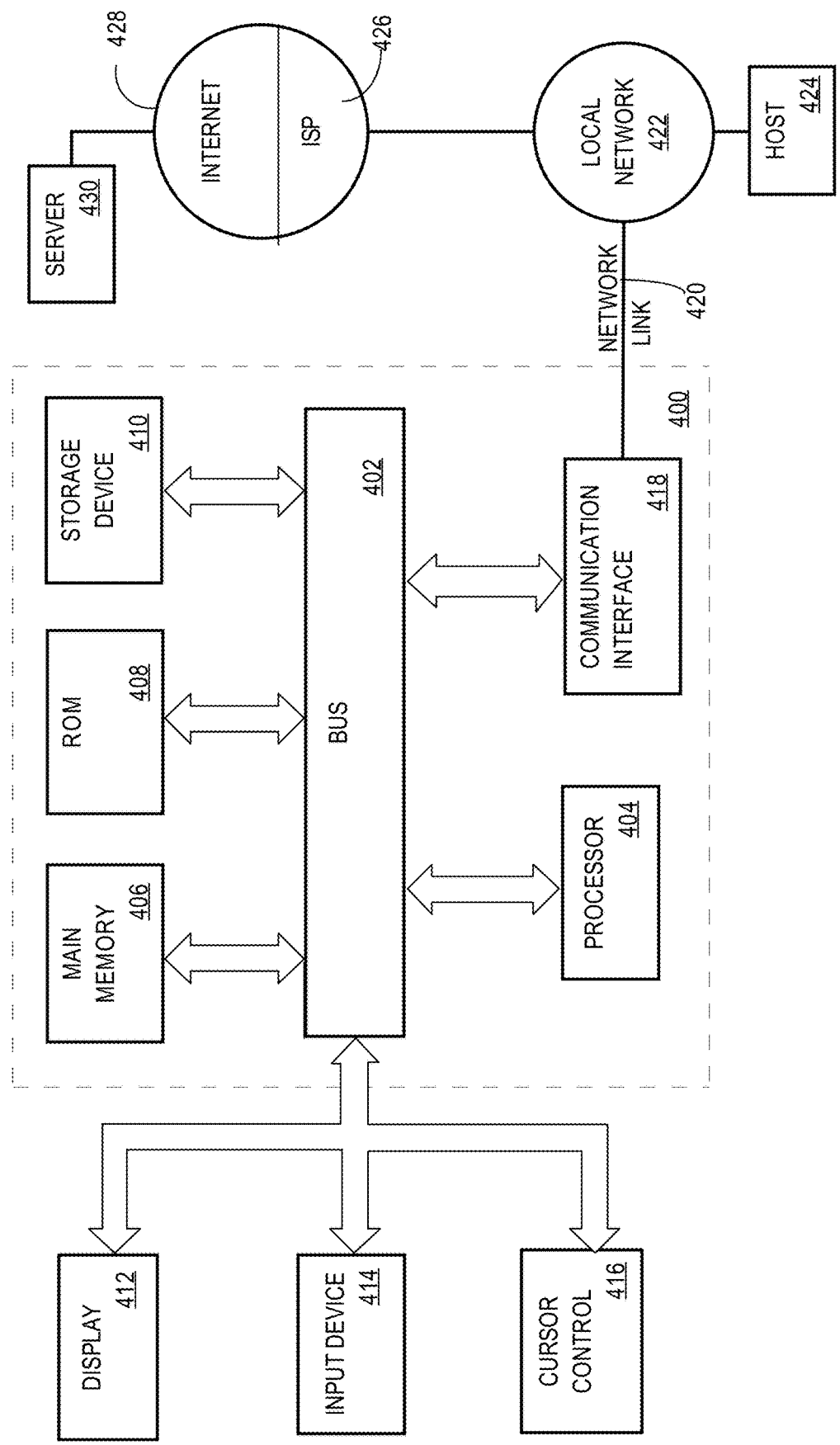
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more of a smart phone, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML, and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multilateration of radio signals, the global positioning system (GPS), WiFi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shape files, native data formats of third parties, and/or farm management information system (FMIS) exports, among others. Receiving data may occur via manual upload, e-mail with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to take action or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus to shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or WiFi-based position or mapping apps that are programmed to determine location based upon nearby WiFi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. patent application Ser. No. 15/551,582, filed on Aug. 16, 2017, may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
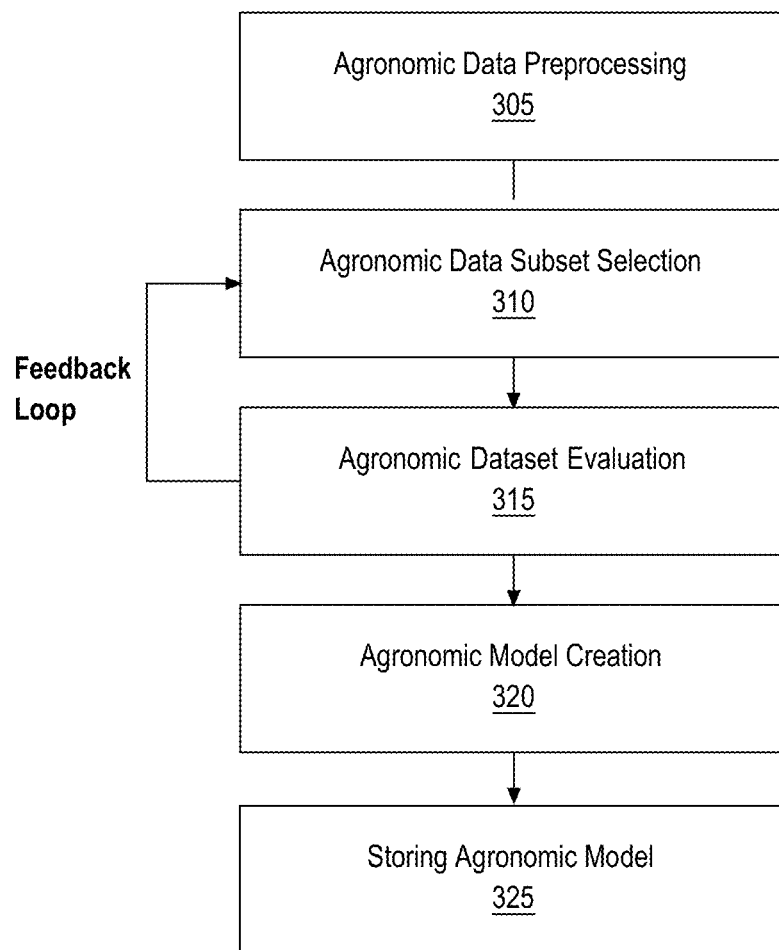
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example-Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. Functional Descriptions

Figure 8:
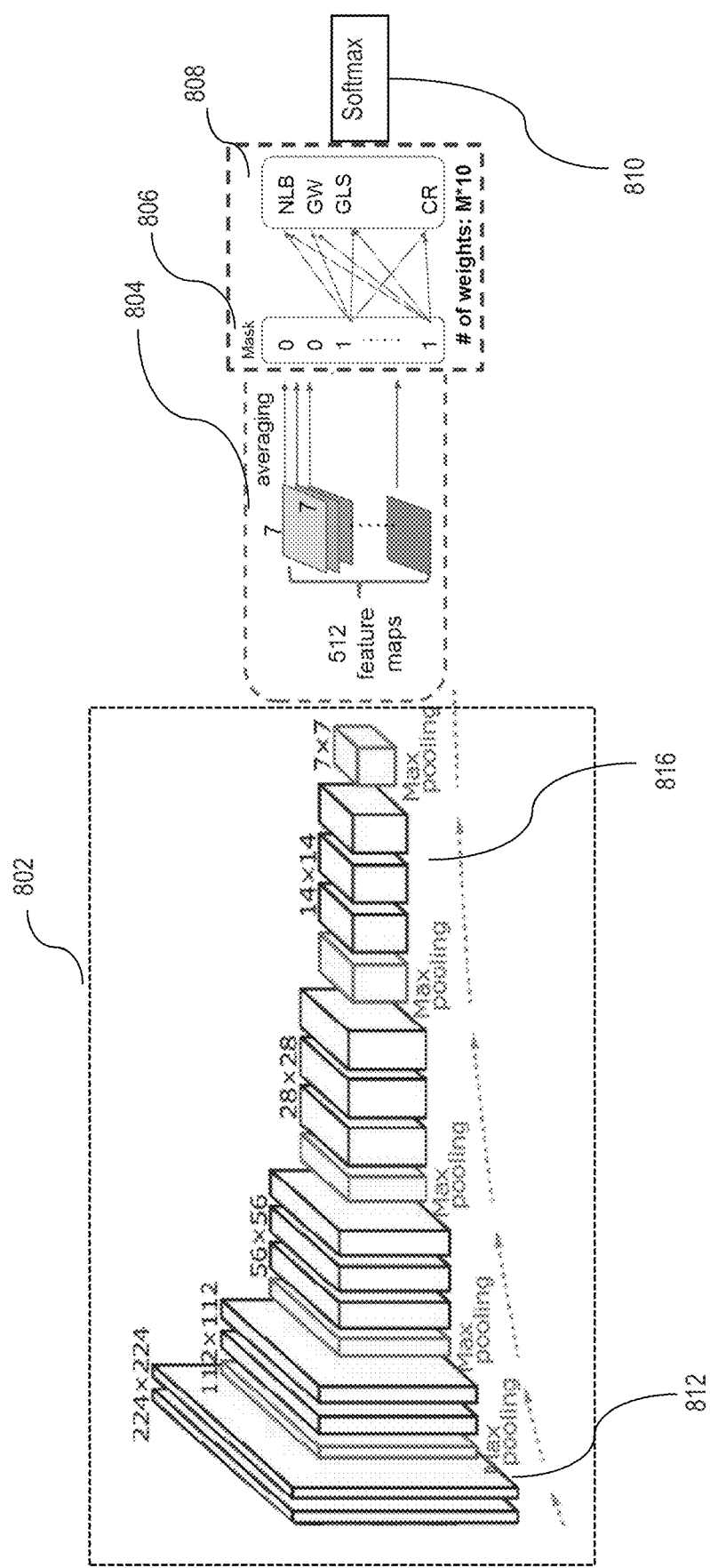
FIG. 8 illustrates an example updated CNN.

In some embodiments, the classification model management server (server) 170 is programmed to update an initial convolutional neural network (CNN) for plant disease recognition or other classification-related purposes. FIG. 8 illustrates an example of updated CNN.

Various published CNNs, such as AlexNet, VGG, GoogleNet, or ResNet, have been adapted for plant disease recognition, and each adapted version can be used as the initial CNN. FIG. 8 includes the framework 802 as a portion of such a typical CNN. The framework 802 includes a series of convolution blocks, each comprising a convolutional layer and a pooling layer, each convolutional layer comprising one or more filters respectively corresponding to one or more features of an image. The size of the image or feature map produced by a convolutional layer goes down along the framework 802. For example, the first convolution block 812 accepts a 224×224 image, and the last convolution block 816 produces 7×7 feature maps. On the other hand, the number of filters can go up along the framework 802. For example, the number of filters in the last convolution block 816 can be 512. This means that the framework 802 outputs 512 7×7 feature maps.

Figure 9:
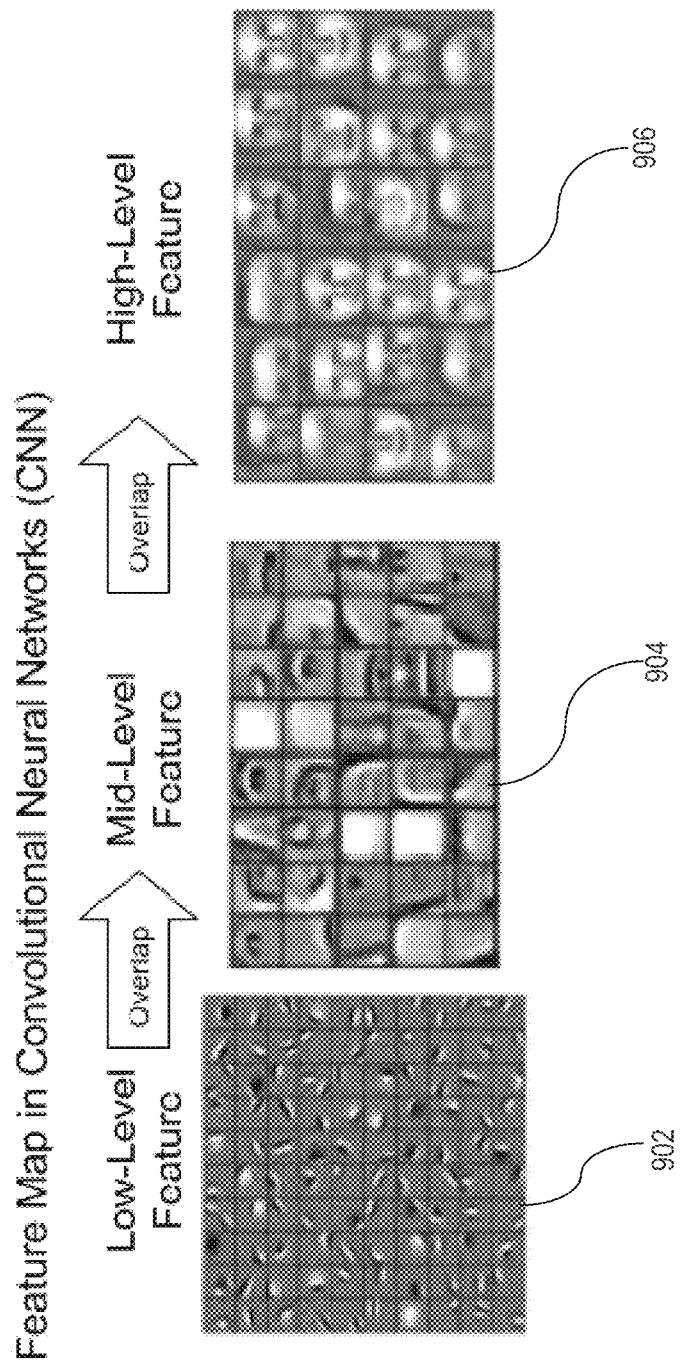
FIG. 9 illustrates an example graphical representation of features corresponding to filters in different convolution blocks of a typically CNN.

The filters in the last few convolution blocks of a CNN often correspond to more global features which may be more representative of the individual classes. FIG. 9 illustrates an example graphical representation of features corresponding to filters in different convolution blocks of a typically CNN. In this example, the CNN is designed for classifying facial expressions. The portion 902 shows the features of given images that correspond to the filters in one of the initial convolution blocks of the CNN. These features tend to describe small areas that may appear in many images or constitute part of the background. The portion 904 shows the features of the given images that correspond to the filters in one of the intermediary convolution blocks of the CNN. These features tend to describe part of a face, such as an eye or a nose. The portion 906 shows the features of the given images that correspond to the filters in one of the final convolution blocks of the CNN. These features tend to describe an entire face, where different parts work together to characterize a certain facial expression. Therefore, the filters in the last few convolution blocks of a CNN may be more likely to represent the individual classes, and a selection from these filters may be more meaningful.

In some embodiments, the server 170 is programmed to generalize the initial CNN by turning off select filters, such as certain filters in the last convolution block, so that the updated CNN essentially captures only the key features sufficient for accurate classification.

3.1 Feature Map Collection

In some embodiments, the server 170 is programmed to build a set of feature maps for selecting filters or their corresponding features. In the case of plant diseases, the goal of applying a given CNN is to determine, given a photo of a plant, whether the plant is infected with any of a number of plant diseases. For corn, common plant diseases include: Anthracnose Leaf Blight (ALB), Common Rust (CR), Eyespot (EYE), Gray Leaf Spot (GLS), Goss's Wilt (GW), Northern Leaf Blight (NLB), Northern Leaf Spot (NLS), Southern Leaf Blight (SLB), and Southern Rust (SR). Therefore, there can be at least ten classes, including a class denoting a healthy plant. The server 170 can also be configured to define additional classes that each correspond to multiple plant diseases. For each class, the server 170 is programmed to first collect a certain number of images, each showing a plant having symptoms of the corresponding plant disease or whatever features characterizing the class. For example, that certain number can be 1,000, leading to a set of 10,000 total images for all ten classes. The set of images may cover minor variations within the class due to environmental or other factors. For example, the set of images can include photos of inoculated corn plants or photos of regular, non-inoculated corn plants. When there exists a class that corresponds to multiple plant diseases, each collected image may show a plant having symptoms of those multiple plant diseases.

In some embodiments, the server 170 is programmed to run each of the collected images through an initial CNN up to and including a specific convolution block of the last few convolution blocks. Referring back to FIG. 8, the specific convolution block can be the very last convolution block 816. As a result, a number of feature maps are generated for each image that is the same as the number of filters in the specific convolutional layer of the specific convolution block, such as 512 for the convolution block 816.

3.2 Feature Selection

In some embodiments, the server 170 is programmed to rank the filters in the specific convolution block or the corresponding features based on the feature maps. For efficiency purposes, each of the feature maps can be reduced to one value through a global average pooling. While the global average pooling is performed to select filters and determine how to update the initial CNN, a global average pooling layer can be part of the initial CNN or the updated CNN, as further discussed below. Referring back to FIG. 8, the framework 804, which is connected to the framework 802, represents a global average pooling layer. Each of the 512 7×7 feature maps is reduced to one value as the average of the 49 values, which in turns produces a vector of 512 values, each vector corresponding to a feature used for classification. The result is as many vectors as the number of collected images.

In some embodiments, the server 170 is programmed to rank the filters in the specific convolution block using the set of vectors. In the example noted above, 1,000 for each of ten classes would lead to 10,000 vectors. The server 170 is programmed to associate each of these vectors with the class label associated with the original image from which the vector is built. In the example noted above, each class label would identify the class associated with the plant disease infecting the plant captured in the original image. Specifically, the server 170 can be programmed to build a random forest from the set of vectors. A random forest can be used to rank the importance of variables, which would be the features used for classification in this case. Such ranking is implemented by the Random Forest function in the R package, for example. The server 170 can be programmed to apply other techniques for ranking model variables known to someone skilled in the art, such as determining correlations between features or scopes of individual features and then removing redundant or overbroad features.

In some embodiments, the server 170 is programmed to next select a particular number of highest-ranking features. The maximum number would be the number of filters in the specific convolution block of the initial CNN, corresponding to selecting all the filters or the corresponding features. The minimum number would be the number of classes, which need to be recognized and distinguished by the updated CNN. The particular number can be predefined to be any number between the maximum number and the minimum number.

3.3 Classification Model Modification

In some embodiments, the server 170 is programmed to update the CNN based on the selection of filters or the corresponding features. The updated CNN can be used to classify new images into multiple classes, such as classifying new photos of corn plants into a healthy class or several disease classes, with higher efficiency and effectiveness.

In some embodiments, the server is programmed to simply remove or disconnect the non-selected filters from the specific convolution block. Alternatively, the server is programmed to perform the steps described in the remaining of this section, which are especially suitable when the specific convolution block is the very last one in the initial CNN. After the series of convolution blocks, the server 170 is programmed to add a global average pooling layer when it is not part of the initial CNN. The server 170 is programmed to further add a masking layer, which simply retains the highest-ranking filters and masks off the other filters, or in other words, accepts only the aggregate feature maps corresponding to the selected filters. Referring back to FIG. 8, the framework 806, which is connected to the framework 804, including a masking layer.

In some embodiments, the initial CNN comprises a classification block following the series of convolution blocks. The classification block may include a fully-connected layer that connects the filters in the last convolution block to the classes followed by a softmax layer. The server 170 is programmed to reuse weights associated the selected filters for the fully-connected layer. Referring back to FIG. 8, the framework 808 includes a fully connected layer, and the framework 810 includes a softmax layer. In the initial CNN, there are 512 weights for the 512 filters in the fully connected layer. Now with certain filters masked off in the updated CNN, the weights for the non-selected filters are no longer needed in the fully connected layer. In other embodiments, the server 170 is programmed to retrain the weights for the selected filters with the set of original images while reusing the other weights in the rest of the initial CNN.

3.4 Alternative Embodiments

Figure 10:
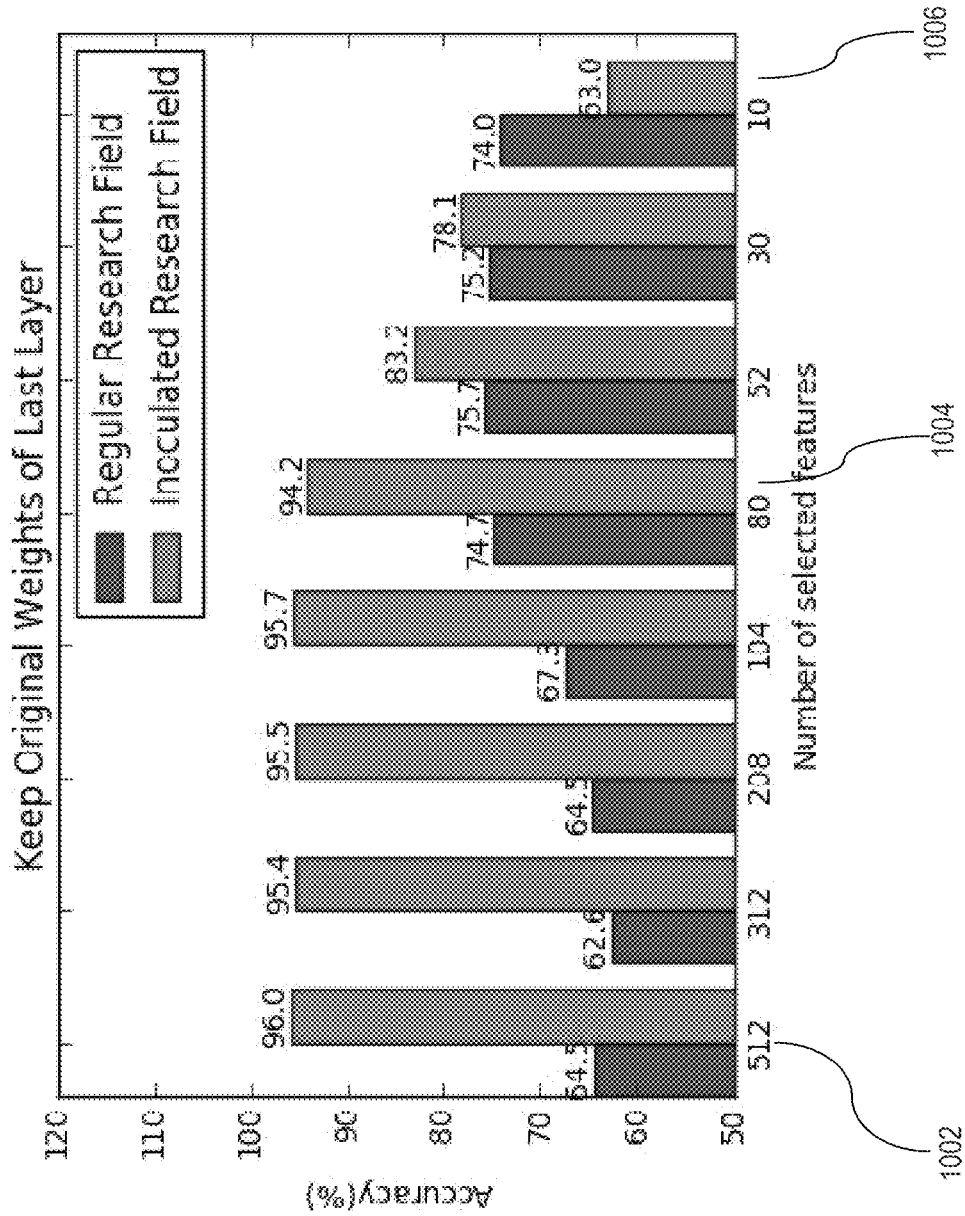
FIG. 10 illustrates an example performance chart for a CNN as the number of selected features varies.

In some embodiments, instead of selecting a fixed number of filters in the specific convolution block, the server 170 is programmed to look for an optimal number of filters with respect to the set of collected images, as discussed below. FIG. 10 illustrates an example performance chart for a CNN as the number of selected filters or corresponding features varies. The performance chart includes a histogram in terms of classification accuracy in the y-axis over different numbers of features selected from the specific convolution layer in the x-axis for two subsets of images. The two subsets of images respectively correspond to plants grown in inoculated or non-inoculated conditions.

In FIG. 10, the data point 1002 corresponds to the selection of all the features. In the example noted above, the last convolution block 806 has 512 filters, and thus the total number of features is 512. The values of the bars thus show the classification accuracy of the initial CNN. In this example, the initial CNN was built from a subset of images corresponding to only plants grown in the inoculated condition and thus achieves a high classification accuracy for such plants but a low classification accuracy for plants grown in the non-inoculated condition. The data point 1006 corresponds to the selection of a minimum number of features, which is typically the number of classes to be recognized and distinguished by a CNN. In the example noted above, the number of classes for nine plant diseases is ten. The data point 1004 corresponds to the selection of an intermediary number of features such that the performance of the updated CNN for plants grown in the non-inoculated condition increases significantly to a near peak while the performance for plants grown in the inoculated condition still remains to be near the peak. This intermediary number can therefore be an optimal number for the number of features or filters. In this manner, the initial CNN can be tentatively updated in different ways corresponding to different numbers of filters selected from the specific convolution block, an optimal number of features can be determined based on the performance of the tentatively updated CNNs, and the initial CNN framework can be finally updated with a selection of the optimal number of filters.

In some embodiments, the updated CNN framework can be further improved with expert input. The server 170 can be programmed to cause display of visual representations of the selected features by a display device. The visual representation of a feature may be in the form of highlighting a portion of an original image that matches the feature. When the highlighted portion looks like a physical attribute that characterizes the class to which the original image belongs, the viewer of the highlighted portion may provide a confirmation of the relevance of the feature.

In some embodiments, the server 170 can be configured to apply visualization techniques known to someone skilled in the art, such as preparing a class activation map or executing a deconvolutional network. For a class activation map, which assigns a contribution to each (x, y) in the space of the feature maps produced by a convolutional layer based on the formula $M_c(x, y) = \Sigma_k w_k^c f_k(x, y)$, with k being the number of features and c being the number of classes, the server 170 can be programmed to use the feature maps produced by the specific convolution block and selected for the updated CNN as $f_k(x, y)$ and the weights for the new fully-connected layer in the updated CNN framework as $w_k^c$. For a deconvolutional network, the server 170 can be configured to run an original image through the series of convolution blocks up to and including the specific convolutional block in the initial or updated CNN and zero out all the feature maps produced by the specific convolution layer. Subsequently, the server 170 can be configured to then send the underlying data for the visual representations of the selected filters in the updated CNN to a client device for display and receive a further selection from those filters included for the updated CNN framework. The server 170 can be configured to further revise the updated CNN, as discussed above, based on the further selection of the filters.

3.5 Example Processes

FIG. 11 illustrates an example method performed by a server computer that is programmed for refining a CNN to focus on class-specific features. FIG. 11 is intended to disclose an algorithm, plan or outline that can be used to implement one or more computer programs or other software elements which when executed cause performing the functional improvements and technical advances that are described herein. Furthermore, the flow diagrams herein are described at the same level of detail that persons of ordinary skill in the art ordinarily use to communicate with one another about algorithms, plans, or specifications forming a basis of software programs that they plan to code or implement using their accumulated skill and knowledge.

In some embodiments, in step 1102, the server 170 is programmed or configured to receive digital data representing an initial CNN. The CNN comprises a series of convolution blocks, each of the series of convolution blocks comprises a convolutional layer having one or more filters, and the convolutional layer in the last convolutional block has a certain number of filters corresponding to a certain number of features. Each of the convolution blocks can also comprise a pooling layer. The initial CNN can also comprise a global average pooling layer, a fully connected layer, and a softmax layer following the series of convolution blocks. The initial CNN is trained to classify a given image into one of a plurality of classes, such as a photo of corn leaves into a healthy class or one of the disease classes.

In some embodiments, in step 1104, the server 170 is programmed or configured to also receive a set of digital images and a corresponding set of class labels each identifying one of the plurality of classes. The set of digital images can include the images used to train the initial CNN or additional images that can also be classified into the plurality of classes. For example, some of the set of digital images used to train the initial CNN may correspond to inoculated corns infected with GLS, and the additional images may correspond to regular, non-inoculated corns infected with GLS.

In some embodiments, in step 1106, the server 170 is programmed or configured to run each of the set of digital images through the series of convolution blocks to generate the certain number of feature maps for each of the set of digital images. The feature maps are produced by the convolutional layer in the last convolution block of the initial CNN, and it is the filters in that last convolution block that will be ranked and selectively incorporated into an updated CNN.

In some embodiments, in step 1108, the server 170 is programmed or configured to compute an aggregate for each of the certain number of feature maps for each of the set of digital images to generate a vector of the certain number of aggregates for each of the set of digital images. The aggregate can be an average of all the values in a feature map.

In some embodiments, in step 1110, the server 170 is programmed or configured to rank the certain number of filters based on the set of vectors for the set of digital images and the associated set of class labels. Various techniques can be used to order the filters or the vector attributes based on how the vectors are ultimately classified into the plurality of classes. One example technique is building a random forest from the set of vectors and obtaining importance indicators for the variables or the vector attributes.

In some embodiments, in step 1112, the server 170 is programmed or configured to select a specific number of highest-ranking filters from the certain number of filters. The server 170 can be programmed to use as the specific number a fixed number between the size of the plurality of classes and the total number of filters in the last convolution block used to construct the vectors. Alternatively, the server 170 can be programmed to experiment with different numbers through different tentatively updated CNNs and select one of those numbers as the specific number for the ultimate, updated CNN.

In some embodiments, in step 1114, the server 170 is programmed or configured to construct an updated CNN comprising the series of convolution blocks, a masking layer that masks out non-selected filters of the certain number of filters, and a fully-connected layer connecting the specific number of filters with the plurality of classes. When the initial CNN has a fully-connected layer connecting all the filters in the convolutional layer in the last convolution block with the plurality of classes, the weights in that fully-connected layer associated with the selected filters can be reused in the fully-connected layer of the updated CNN. Alternatively, those weights in the fully-connected layer of the updated CNN can be trained using any CNN training technique known to someone skilled in the art. The updated CNN can further comprise a global average pooling layer between the series of convolution blocks and the masking layer that reduces each feature map produced by the last convolution block to one value. The updated CNN can further comprise a softmax layer at the end to generate classifications with confidence scores.

In some embodiments, in step 1116, the server 170 is programmed or configured to apply the updated CNN to a new image received from a client device to obtain a classification of the new image into one or more of the plurality of classes. For example, the new image can be another photo of corn leaves. In step 1118, the server 170 is programmed or configured to transmit the classification to another device. For example, the classification can indicate whether the corn leaves are infected by any of the plurality of plant diseases.

4. Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method of refining a convolutional neural network to focus on class-specific features, comprising:
   receiving, by a processor, digital data representing an initial convolutional neural network (CNN) comprising a series of convolution blocks,
      each of the series of convolution blocks comprising a convolutional layer having one or more filters,
      a convolutional layer of a distinct number of last convolution blocks of the series of convolution blocks having a certain number N of filters corresponding to N features;
   receiving, by the processor, a set of digital images and a corresponding set of class labels each identifying a class of a plurality of classes;
   processing each digital image in the set of digital images using the series of convolution blocks to generate N feature maps from the convolutional layer for each of the set of digital images;
   generating a vector for each of the set of digital images only from the N feature maps for the digital image;
   ranking the N filters based on the set of vectors for the set of digital images and the corresponding set of class labels;
   selecting a particular number of highest-ranking filters from the N filters;
   constructing an updated CNN from the initial CNN to eliminate application of non-selected filters of the N filters of the convolutional layer of the distinct number of last convolution blocks;
   applying the updated CNN to a new image received from a client device to obtain a classification of the new image into one of the plurality of classes;
   transmitting information related to the classification.

2. The computer-implemented method of claim 1,
   one of the set of digital images is a photo of a type of plant,
   one of the plurality of classes is a disease likely to affect the type of plant.

3. The computer-implemented method of claim 1, each of the series of convolution blocks further comprising a pooling layer.

4. The computer-implemented method of claim 1, the certain number being larger than a number of filters associated with a convolutional layer of one of the series of convolution blocks other than the distinct number of last convolution blocks.

5. The computer-implemented method of claim 1, the generating comprising computing a component of the vector as an aggregate over values in a feature map of the N feature maps for the digital image.

6. The computer-implemented method of claim 1,
   the generating comprising performing global average pooling on each of the N feature maps for the digital image.

7. The computer-implemented method of claim 1, the selecting being based on past results associated with different number of highest-ranking filters selected for constructing an updated CNN.

8. The computer-implemented method of claim 1, the ranking comprising building a random forest from the set of vectors and the associated set of class labels.

9. The computer-implemented method of claim 1, the updated CNN comprising the series of convolution blocks and a masking layer that masks out non-selected filters of the N filters.

10. The computer-implemented method of claim 1, the constructing comprising modifying the convolutional layer to remove non-selected filters from the N filters.

11. The computer-implemented method of claim 1, the initial CNN further comprising a classification block after the series of convolution blocks, the classification block including a fully-connected layer.

12. The computer-implemented method of claim 11, the updated CNN comprising an updated classification block, the updated classification block including the fully-connected layer retaining weights associated with the particular number of highest-ranking filters.

13. The computer-implemented method of claim 12, the updated classification block further including a softmax layer.

14. One or more non-transitory computer-readable media storing one or more sequences of instructions which when executed using one or more processors cause the one or more processors to execute a method of refining a convolutional neural network to focus on class-specific features, the method comprising:
receiving digital data representing an initial convolutional neural network (CNN) comprising a series of convolution blocks,
each of the series of convolution blocks comprising a convolutional layer having one or more filters,
a convolutional layer of a distinct number of last convolution blocks of the series of convolution blocks having a certain number N of filters corresponding to N features;
receiving a set of digital images and a corresponding set of class labels each identifying a class of a plurality of classes;
processing each digital image in the set of digital images using the series of convolution blocks to generate N feature maps from the convolutional layer for each of the set of digital images;
generating a vector for each of the set of digital images only from the N feature maps for the digital image;
ranking the N filters based on the set of vectors for the set of digital images and the corresponding set of class labels;
selecting a particular number of highest-ranking filters from the N filters;
constructing an updated CNN from the initial CNN to eliminate application of non-selected filters of the N filters of the convolutional layer of the distinct number of last convolution blocks;
applying the updated CNN to a new image received from a client device to obtain a classification of the new image into one of the plurality of classes;
transmitting information related to the classification.

15. The one or more non-transitory computer-readable media of claim 14, the generating comprising computing a component of the vector as an aggregate over values in a feature map of the N feature maps for the digital image.

16. The computer-implemented method of claim 1, the selecting being based on past results associated with different number of highest-ranking filters selected for constructing an updated CNN.

17. The one or more non-transitory computer-readable media of claim 14, the ranking comprising building a random forest from the set of vectors and the associated set of class labels.

18. The one or more non-transitory computer-readable media of claim 14, the updated CNN comprising the series of convolution blocks and a masking layer that masks out non-selected filters of the N filters.

19. The one or more non-transitory computer-readable media of claim 14, the initial CNN further comprising a classification block after the series of convolution blocks, the classification block including a full-connected layer.

20. The one or more non-transitory computer-readable media of claim 19, the updated CNN comprising an updated classification block, the updated classification block including the fully-connected layer retaining weights associated with the particular number of highest-ranking filters.

* * * * *